US011367930B2

(12) United States Patent
Okazaki et al.

(10) Patent No.: US 11,367,930 B2
(45) Date of Patent: Jun. 21, 2022

(54) BUS BAR MODULE

(71) Applicant: YAZAKI CORPORATION, Tokyo (JP)

(72) Inventors: Yutaro Okazaki, Kakegawa (JP); Shinichi Yanagihara, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 86 days.

(21) Appl. No.: 16/903,391

(22) Filed: Jun. 17, 2020

(65) Prior Publication Data

US 2020/0403208 A1    Dec. 24, 2020

(30) Foreign Application Priority Data

Jun. 18, 2019  (JP) .............................. JP2019-112848

(51) Int. Cl.
*H01M 10/48* (2006.01)
*H01M 10/42* (2006.01)
*H01M 50/502* (2021.01)
*H01M 50/531* (2021.01)
*H01M 50/20* (2021.01)

(52) U.S. Cl.
CPC ....... *H01M 50/502* (2021.01); *H01M 10/425* (2013.01); *H01M 10/482* (2013.01); *H01M 50/20* (2021.01); *H01M 50/531* (2021.01); *H01M 2220/20* (2013.01)

(58) Field of Classification Search
CPC .. H01M 50/502; H01M 50/531; H01M 50/20; H01M 10/425; H01M 10/482; H01M 2220/20

See application file for complete search history.

(56) References Cited

U.S. PATENT DOCUMENTS

| 2004/0043663 | A1  |        | 3/2004 | Ikeda et al. |              |
|--------------|-----|--------|--------|--------------|--------------|
| 2005/0079408 | A1  | *      | 4/2005 | Hirano       | H01M 10/625  |
|              |     |        |        |              | 429/174      |
| 2010/0062329 | A1  | *      | 3/2010 | Muis         | H01M 10/482  |
|              |     |        |        |              | 429/158      |
| 2011/0064987 | A1  | *      | 3/2011 | Ogasawara    | H01M 50/502  |
|              |     |        |        |              | 174/68.2     |
| 2012/0115014 | A1  | *      | 5/2012 | Park         | H01M 50/529  |
|              |     |        |        |              | 429/159      |
| 2014/0212732 | A1  | *      | 7/2014 | Ichikawa     | H01M 50/502  |
|              |     |        |        |              | 174/68.2     |

FOREIGN PATENT DOCUMENTS

| EP | 2 461 392 A2    |   | 6/2012  |
|----|-----------------|---|---------|
| EP | 2461392         | * | 6/2012  |
| JP | 2011-65863 A    |   | 3/2011  |
| JP | 2020-166991 A   |   | 10/2020 |

* cited by examiner

*Primary Examiner* — Alexander Usyatinsky
(74) *Attorney, Agent, or Firm* — Kenealy Vaidya LLP (57) ABSTRACT

A bus bar includes a plurality of fastening holes in which a plurality of electrodes of a single cell is fastened with a nut, and a plurality of projections formed between the fastening holes and projecting in a direction away from the single cell. A case includes a bus bar hosing portion in which the bus bar is housed, and a support portion disposed in the projection of the bus bar housed in the bus bar housing portion and abutting against a back surface of the projection to support the bus bar. The support portion has a width smaller than an interval between inner side surfaces of side plate portions of the projection.

4 Claims, 7 Drawing Sheets

BUS BAR MODULE

CROSS-REFERENCE TO RELATED APPLICATIONS

This application is based on and claims priority under 35 USC 119 from Japanese Patent Application No. 2019-112848 filed on Jun. 18, 2019, the contents of which are incorporated herein by reference.

TECHNICAL FIELD

The present invention relates to a bus bar module.

BACKGROUND ART

For example, a power supply device mounted on various vehicles which are an electric automobile that travels using an electric motor, a hybrid automobile that travels using an engine and an electric motor in combination, and the like includes a bus bar module including a bus bar connected to electrodes of a plurality of single cells of a battery assembly and a case that houses the bus bar and guides a routing path of an electric wire extending from the bus bar or the like (for example, see Patent Literature 1). The bus bar of the bus bar module is supported from below by a plate-shaped support portion provided in the case, and is fastened to the electrode of each single cell using a nut.

CITATION LIST

Patent Literature

Patent Literature 1: JP-A-2011-65863

SUMMARY OF INVENTION

The plurality of single cells of the battery assembly vary in height position depending on assembled states of the plurality of single cells. Then, when the electrodes of the adjacent single cells are connected to one another by the bus bar, a fastening position may be shifted in a height direction, and a fastening state of the bus bar to the electrodes by the nuts may become unstable.

The present invention has been made in view of the above-described circumstances. An aspect of the present invention provides a bus bar module in which a bus bar can be smoothly and stably fixed and electrically connected to an electrode of a single cell of a battery assembly.

Solution to Problem (1) A bus bar module including: a case that is assembled to a battery assembly including a plurality of single cells; a bus bar that is supported by the case, that is electrically connected to an electrode of the single cell of the battery assembly, and that is formed of a conductive metal plate, in which the bus bar includes: a plurality of electrical connection portions configured to electrically connect and fix a plurality of the electrodes of the single cells; and a plurality of projections that are each formed between the electrical connection portions and protrude in a direction away from the single cell, in which the case includes: a bus bar housing portion in which the bus bar is housed; and a support portion that is provided in the projection of the bus bar housed in the bus bar housing portion and abuts against a back surface of the projection to support the bus bar, and in which the support portion has a width smaller than an interval between inner side surfaces of side plate portions of the projection.

(2) The bus bar module according to (1),
in which the support portion is in line contact with the back surface of the projection in a direction orthogonal to an arrangement direction of the electrical connection portions.

(3) The bus bar module according to (1),
in which, in the bus bar, at least three electrical connection portions are formed at equal intervals, and the projections are formed between the electrical connection portions, respectively, and
in which the case includes the support portion corresponding to each of the projections of the bus bar housed in the bus bar housing portion.

According to the bus bar module having the configuration (1), when the electrode is fixed to the electrical connection portion of the bus bar to electrically connect the bus bar to the electrode, the projection of the bus bar supported on the support portion is easily elastically deformed. Therefore, even if displacement in an assembling direction of the bus bar occurs between the electrodes of the adjacent single cells, it is possible to easily absorb the displacement by the elastic deformation of the projection. In this case, the support portion has the width smaller than the interval between the inner side surfaces of the side plate portions of the projection, so that side surfaces of the support portion do not abut against the inner surfaces of the side plate portion of the projection, and thus do not prevent the elastic deformation. Accordingly, when the bus bar is electrically connected to the electrode, it is possible to constantly and stably fix the electrical connection portion to the electrode with a predetermined fixing force and to attain good connection reliability.

According to the bus bar module having the configuration (2), the support portion is in line contact with the back surface of the projection in the direction orthogonal to the arrangement direction of the electrical connection portions. Accordingly, when the bus bar is electrically connected to the electrode in a state in which the displacement in the assembling direction of the bus bar has occurred between the electrodes of the adjacent single cells, it is possible to easily incline the bus bar using a part thereof in contact with the support portion as a fulcrum. Accordingly, it is possible to more easily absorb the displacement between the electrodes of the single cells.

According to the bus bar module having the configuration (3), when the bus bar is fixed to the electrodes of the single cells with three or more electrical connection portions, the displacement in the assembling direction of the bus bar is likely to occur among the electrodes of three or more adjacent single cells. However, the projection of the bus bar formed between the electrical connection portions is supported on the support portion. Accordingly, even if the displacement occurs among the electrodes fastened in the electrical connection portions, it is possible to elastically deform the projection supported by the support portion between the electrical connection portions to easily absorb the displacement.

According to the present invention, it is possible to provide a bus bar module in which a bus bar can be smoothly and stably fixed and electrically connected to an electrode of a single cell of a battery assembly.

The present invention has been briefly described as above. Details of the present invention will be further clarified by reading a mode (hereinafter, referred to as an "embodiment") for carrying out the present invention described below with reference to the accompanying drawings.

BRIEF DESCRIPTION OF DRAWINGS

FIGS. 6A and 6B illustrate a state in which the single cell has shifted in a height direction, in which

DESCRIPTION OF EMBODIMENTS

Hereinafter, an embodiment of the present invention will be described with reference to the drawings.

Figure 1:
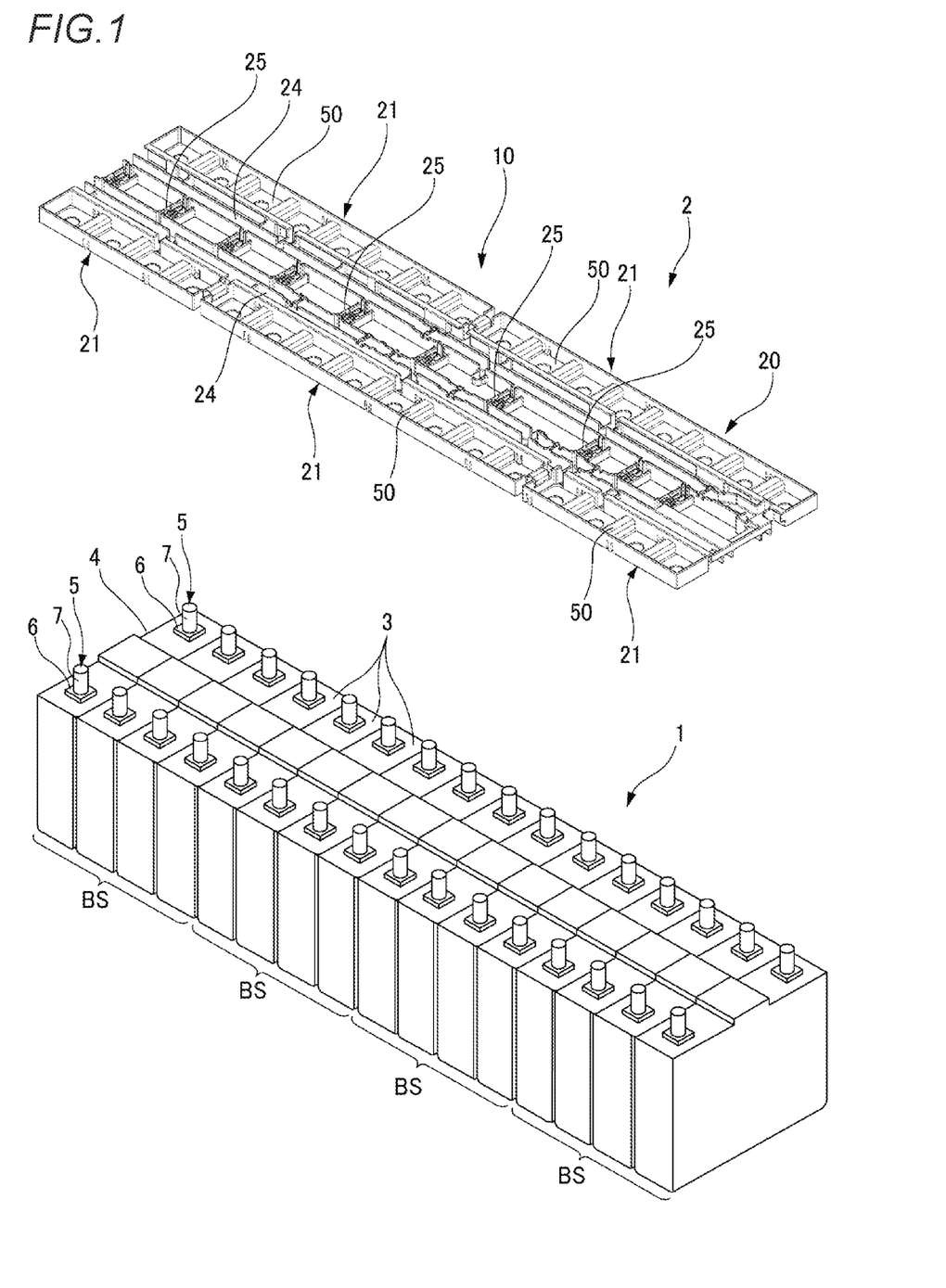
FIG. 1 is a perspective view of a bus bar module and a battery assembly according to an embodiment.

FIG. 1 is a perspective view of a bus bar module and a battery assembly according to the present embodiment.

As illustrated in FIG. 1, the bus bar module 10 according to the present embodiment is assembled to an upper part of a battery assembly 1 to form a power supply device 2. The power supply device 2 is mounted and used on various vehicles which are an electric automobile that travels using an electric motor, a hybrid automobile that travels using an engine and an electric motor in combination, and the like, and is configured to supply power to the electric motor.

The battery assembly 1 includes a plurality of single cells 3 that are arranged in a row along one direction and are fixed to one another. Each single cell 3 includes a rectangular parallelepiped battery body 4, and a pair of electrodes 5 protruding from near one end of an upper surface of the battery body 4 and from near the other end of the upper surface. One of the pair of electrodes 5 is a positive electrode and the other is a negative electrode.

The single cells 3 are arranged such that the battery bodies 4 are in contact with one another. In the battery assembly 1, poles of the electrodes 5 are aligned for every four single cells 3 adjacent to one another, and one battery set BS is formed of the four single cells 3 in which the poles of the electrode 5 are aligned. In this example, the battery assembly 1 includes four battery sets BS each including four single cells 3, and the battery sets BS of the single cells 3 that are adjacent to one another are arranged such that the poles of the electrodes 5 are alternated.

Each of the pair of electrodes 5 is formed of a conductive metal. The electrode 5 includes a plate-shaped seat plate portion 6 and a columnar pole post 7 erected at a center of the seat plate portion 6. A male screw is formed on an outer periphery of the pole post 7, and a nut 60 (described below) is fastened thereto.

Figure 2:
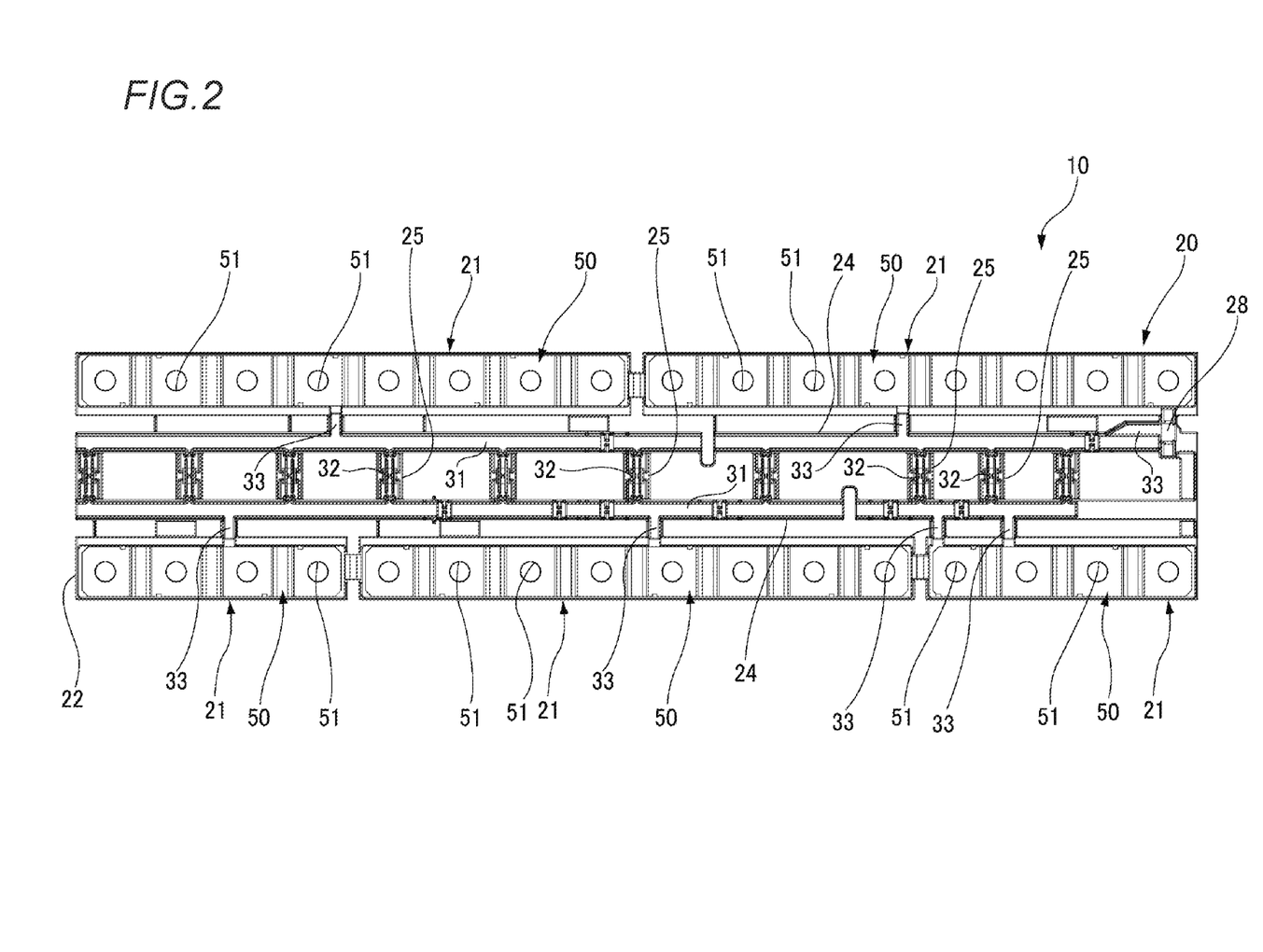
FIG. 2 is a top view of the bus bar module according to the present embodiment.

FIG. 2 is a top view of the bus bar module according to the present embodiment.

As illustrated in FIG. 2, the bus bar module 10 includes a case 20 and a bus bar 50. The bus bar module 10 connects the battery sets BS of the single cells 3 in series.

The case 20 is integrally formed of, for example, a synthetic resin or the like, and includes a plurality of bus bar housing portions 21.

The bus bar housing portions 21 are arranged in two rows along an arrangement direction of the plurality of single cells 3. The bus bar housing portion 21 is formed of a frame including a peripheral wall portion 22, and the bus bar 50 is housed in the bus bar housing portion 21.

The case 20 includes two support beam portions 24 along the arrangement of the bus bar housing portions 21, and the bus bar housing portions 21 are connected to and supported by the support beam portions 24, respectively. The two support beam portions 24 are connected in parallel by bridge portions 25.

One of the support beam portions 24 is provided with an electric wire routing groove portion 31. The electric wire routing groove portion 31 is formed in a gutter shape with an upper side thereof opened. A thermistor mounting portion 28 is formed at an end of the other support beam portion 24, and a thermistor (not illustrated) configured to detect a temperature of the single cell 3 is mounted on the thermistor mounting portion 28.

The bridge portion 25 connecting the support beam portions 24 is provided with a gutter-shaped electric wire routing groove portion 32 whose upper side is opened, and the electric wire routing groove portion 32 is provided continuously with the electric wire routing groove portion 31.

The bus bar housing portion 21 and the thermistor mounting portion 28 are provided continuously with gutter-shaped electric wire routing groove portions 33 whose upper sides are opened. The electric wire routing groove portion 33 provided continuously with the bus bar housing portion 21 in one row is provided continuously with the electric wire routing groove portion 31 of the one of support beam portions 24, and the electric wire routing groove portion 33 provided continuously with the bus bar housing portion 21 in the other row and the thermistor mounting portion 28 is provided continuously with the electric wire routing groove portion 32 of the bridge portion 25.

The electric wire routing groove portions 31, 32, 33 of the case 20 house an electric wire (not illustrated) for voltage detection electrically connected to the bus bar 50 and an electric wire (not illustrated) extending from the thermistor. These electric wires are led out from an end of the electric wire routing groove portion 31 of the one of the support beam portions 24, and are connected to a circuit board (not illustrated) including a voltage monitoring circuit and a temperature monitoring circuit.

Figure 3:
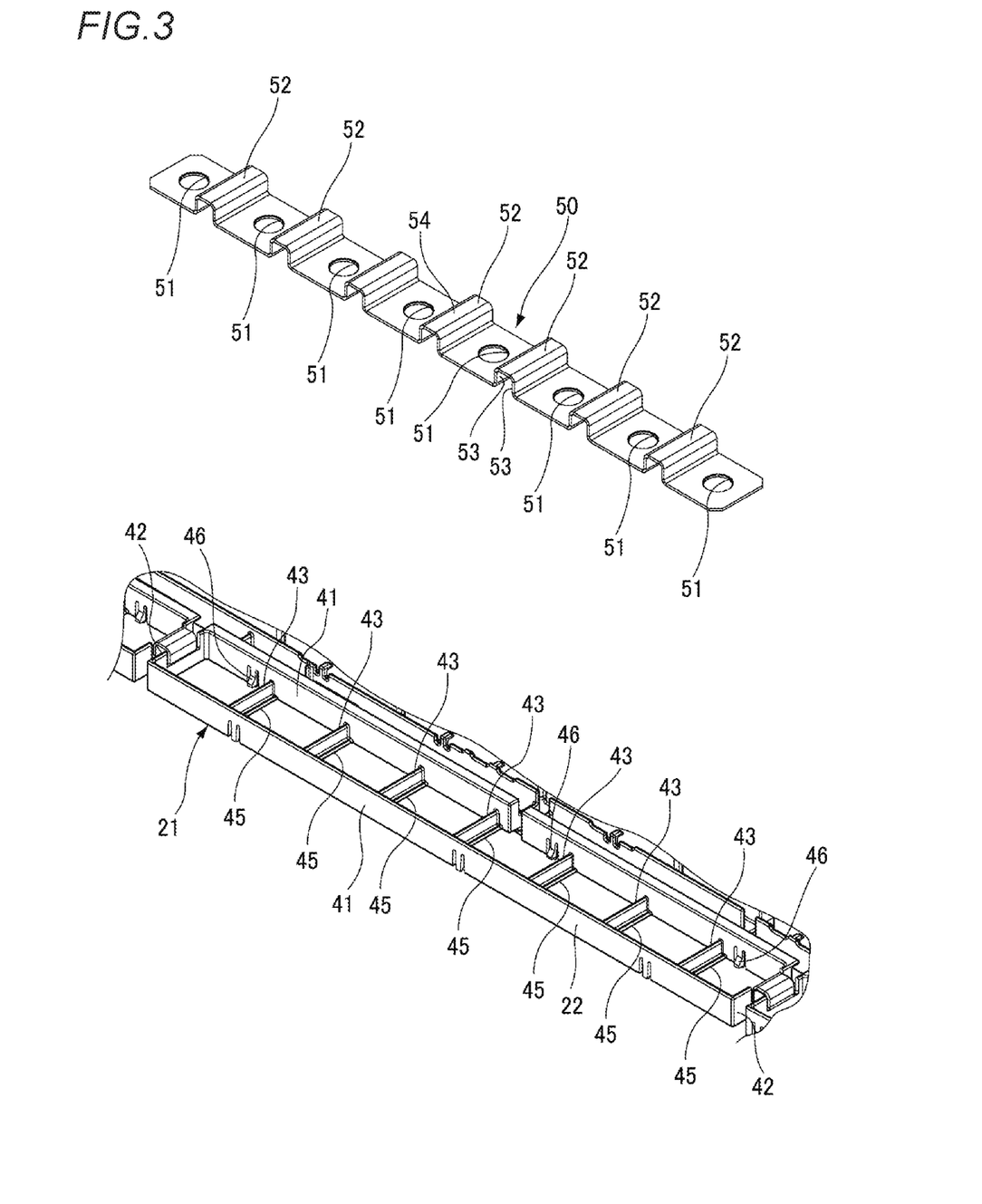
FIG. 3 is a perspective view of a bus bar housing portion and a bus bar.
Figure 4:
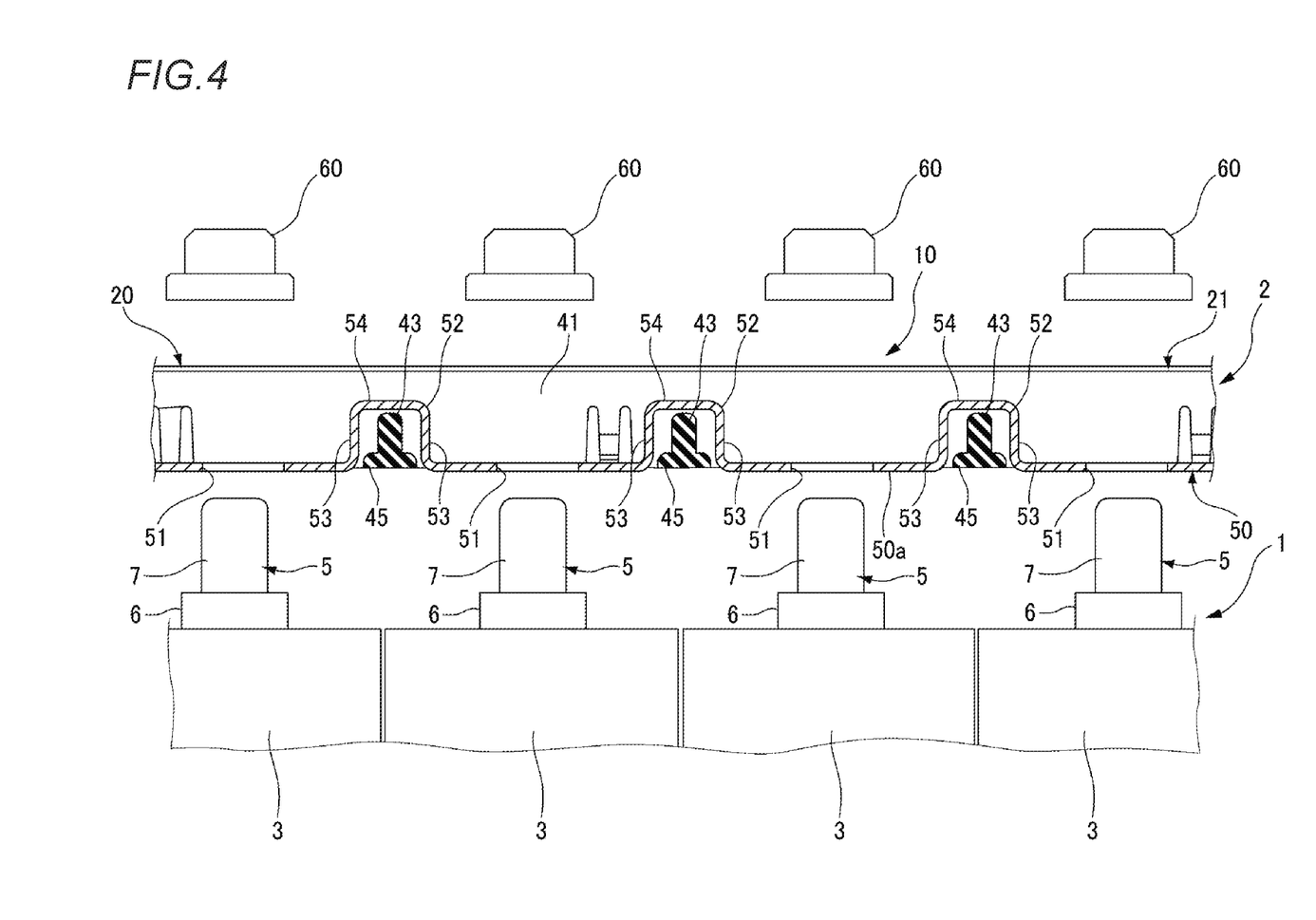
FIG. 4 is a cross-sectional view of the bus bar module that is fastened and assembled to an electrode of a single cell of the battery assembly by a nut.
Figure 5:
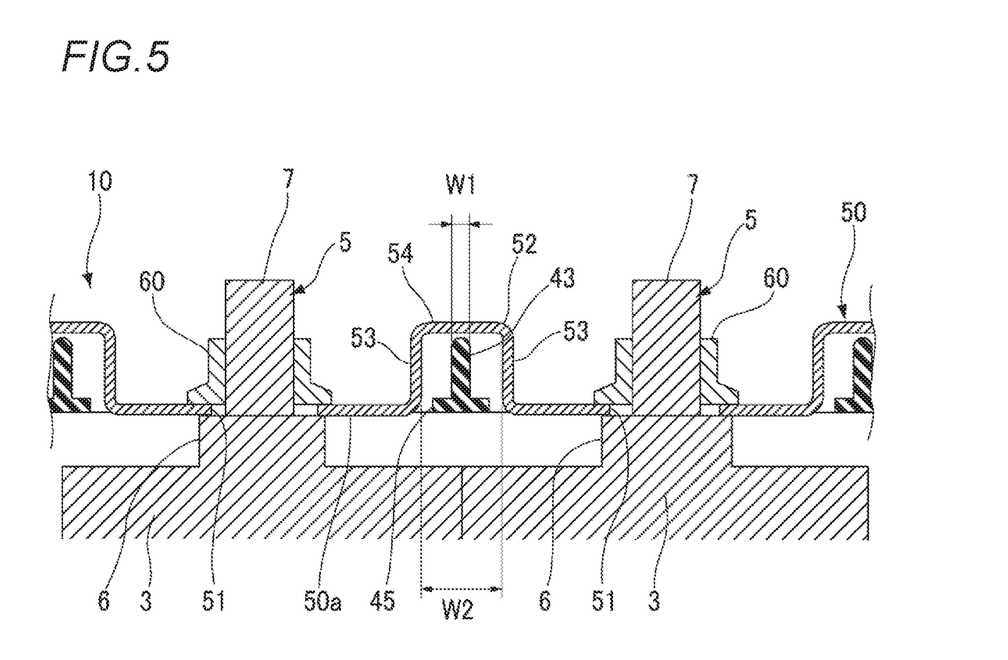
FIG. 5 is a schematic cross-sectional view of the bus bar module that is fastened and assembled to the electrode of the single cell of the battery assembly.

FIG. 3 is a perspective view of a bus bar housing portion and a bus bar FIG. 4 is a cross-sectional view of the bus bar module that is fastened and assembled to an electrode of a single cell of the battery assembly by a nut. FIG. 5 is a schematic cross-sectional view of the bus bar module that is fastened and assembled to the electrode of the single cell of the battery assembly.

As illustrated in FIGS. 3 to 5, the bus bar 50 housed in the bus bar housing portion 21 of the case 20 is formed to be long. The bus bar 50 is formed by punching and bending a conductive metal plate. The bus bar 50 is formed with a plurality of fastening holes 51 as electrical connection portions. These fastening holes 51 are formed at the same pitch as a pitch of the electrodes 5 along the arrangement direction of the single cells 3 of the battery assembly 1. The fastening hole 51 has an inner diameter slightly larger than an outer diameter of the pole post 7 of the electrode 5. The pole posts 7 of the electrodes 5 are inserted through the fastening holes 51. The nut 60 is screwed and fastened to the pole post 7 of the electrode 5 passed through the fastening hole 51 of the bus bar 50. Accordingly, an edge of the fastening hole 51 in the bus bar 50 is fastened (fixed) while being interposed between the seat plate portion 6 of the electrode 5 and the nut 60, and the bus bar 50 and the electrode 5 are electrically connected.

The bus bar 50 includes a projection 52 between the adjacent fastening holes 51. The projection 52 is formed in a convex shape protruding upward, and includes a pair of side plate portions 53 facing each other and an upper plate portion 54 provided continuously with upper edges of the side plate portions 53.

The peripheral wall portion 22 of the bus bar housing portion 21 formed of the frame that houses the bus bar 50 includes a pair of long side portions 41 and a pair of short side portions 42, and the short side portion 42 is provided continuously with both ends of the long side portion 41. The bus bar housing portion 21 includes a plurality of support portions 43. The support portions 43 are integrally formed being bridged over the long side portions 41 of the peripheral wall portion 22, and are provided at intervals in a longitudinal direction of the bus bar housing portion 21.

The support portion 43 is formed in a plate shape, and an upper edge thereof is formed in an arc shape as viewed in cross section. The support portion 43 extends in a direction orthogonal to an arrangement direction of the fastening holes 51 of the bus bar 50 housed in the bus bar housing portion 21. The support portion 43 is erected on a base portion 45 formed in a plate shape. The base portion 45 is formed integrally at a tower edge of the support portion 43 while protruding to both sides. The support portion 43 is formed narrower than the base portion 45. A width W1 of the support portion 43 is smaller than an interval W2 between inner side surfaces of the side plate portions 53 of the projection 52 formed on the bus bar 50.

The support portion 43 is provided inside the projection 52 of the bus bar 50 substantially below a center of the projection 52 in a state in which the bus bar 50 is housed in the bus bar housing portion 21 from above. The support portion 43 abuts against a back surface of the upper plate portion 54 of the projection 52 to support the bus bar 50. In the state in which the bus bar 50 is housed in the bus bar housing portion 21, the base portion 45 is provided above a lower surface 50a of the bus bar 50 in a protruding direction of the projection 52. Accordingly, in the state in which the bus bar 50 is housed in the bus bar housing portion 21, the base portion 45 of the support portion 43 is wrapped to the bus bar 50 in a direction in which the bus bar 50 is fastened to the electrode 5.

The bus bar housing portion 21 includes a plurality of locking claws 46 on the long side portion 41. When the bus bar 50 has been housed in the bus bar housing portion 21 from above, a periphery of the bus bar 50 is locked by the locking claws 46. Accordingly, the bus bar 50 is prevented from falling out of the bus bar housing portion 21 in a state in which the projection 52 of the bus bar 50 is supported by the support portion 43.

In order to assemble the bus bar module 10 having the above-described structure to the battery assembly 1, the bus bar module 10 is placed on the upper part of the battery assembly 1, and the pole post 7 of the electrode 5 of the single cell 3 is inserted into the fastening hole 51 of the bus bar 50.

Next, the nut 60 is screwed and fastened to the pole post 7 of the electrode 5 inserted into the fastening hole 51 of the bus bar 50.

Accordingly, the edge of the fastening hole 51 in the bus bar 50 is interposed between the seat plate portion 6 of the electrode 5 and the nut 60, and the bus bar 50 and the electrode 5 are electrically connected.

Figure 6A:
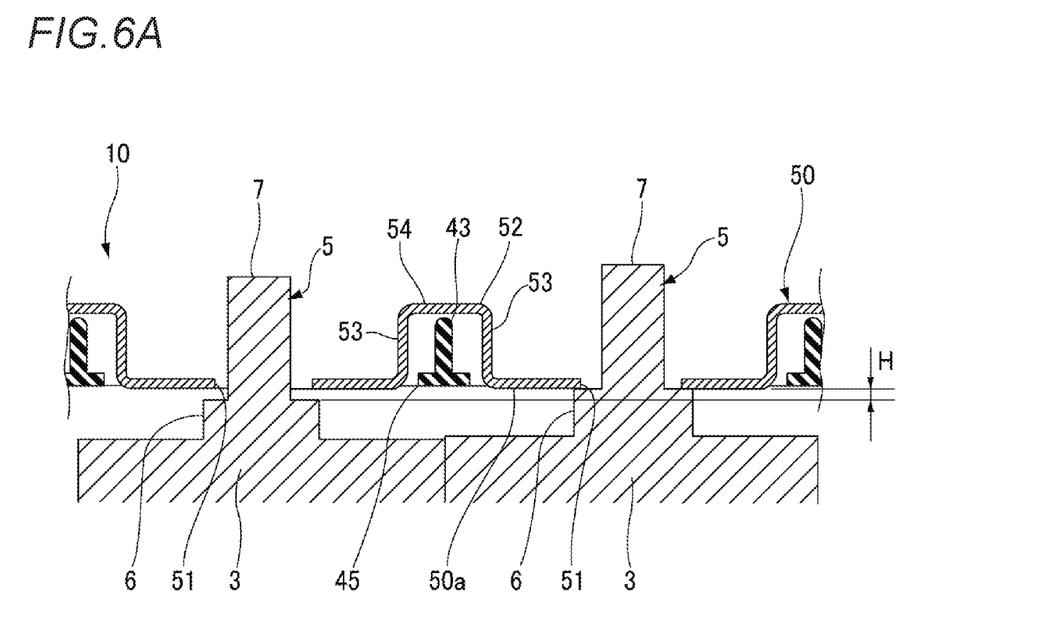
FIG. 6A is a schematic cross-sectional view of the bus bar module before being fastened to the electrode.

As illustrated in FIG. 6A, the plurality of single cells 3 of the battery assembly 1 may vary in height position depending on assembled states of the plurality of single cells 3, and a displacement H in the height direction may occur between fastening surfaces which are upper surfaces of the seat plate portions 6 of the adjacent electrodes 5.

Figure 6B:
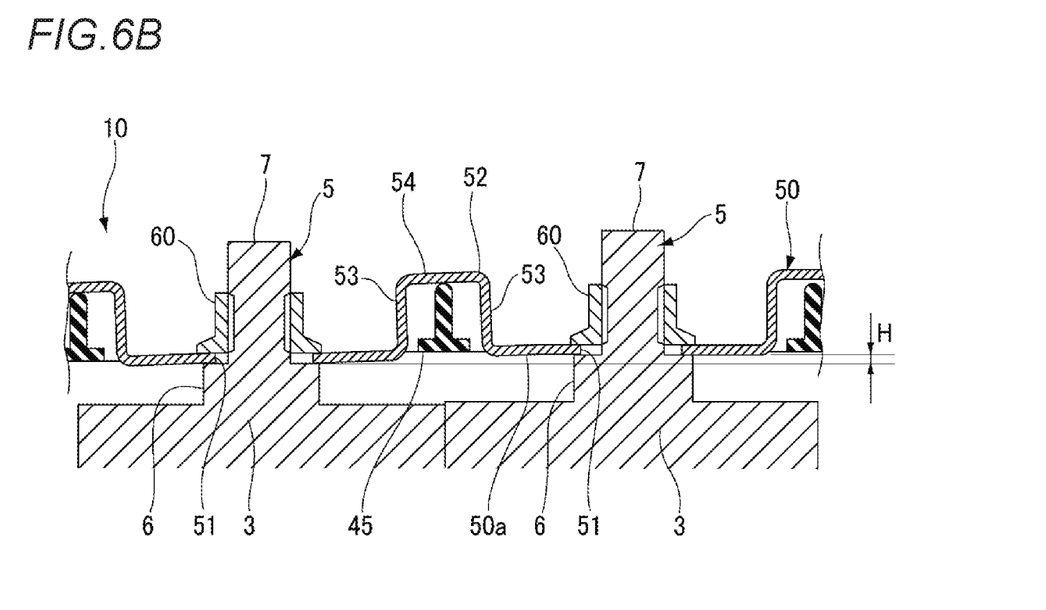
FIG. 6B is a schematic cross-sectional view of the bus bar module in a state of being fastened to the electrode.

However, in the bus bar module 10 according to the present embodiment, the projection 52 of the bus bar 50 is elastically deformed, so that it is possible to absorb the displacement H between the fastening surfaces of the adjacent electrodes 5 in the height direction as illustrated in FIG. 6B.

Figure 7:
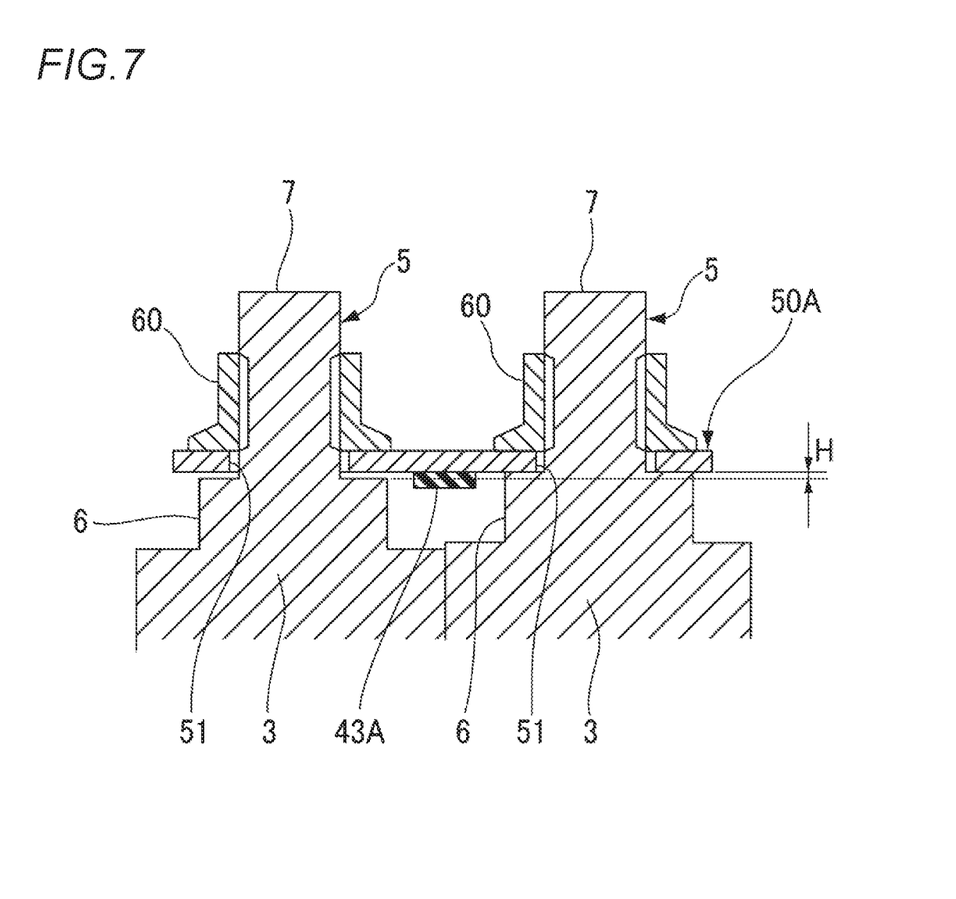
FIG. 7 is a schematic cross-sectional view of a bus bar module according to a reference example when being fastened in a state in which single cells are shifted in a height direction.

Here, as illustrated in FIG. 7, a flat bus bar 50A not including the projection 52 is fastened to the electrode 5 of the single cell 3, and the lower surface 50a of the bus bar 50 is supported by a plate-shaped support portion 43A between the fastening holes 51.

In this structure, when the bus bar 50A is fastened to the electrodes 5 by the nuts 60, the fastening state of the bus bar 50A to the electrodes 5 by the nuts 60 may become unstable due to the displacement H between the fastening surfaces which are the upper surfaces of the seat plate portions 6 of the electrodes 5 in the height direction. For example, when the bus bar 50A is fastened to a high electrode 5, a gap is formed between the bus bar 50A and an upper surface of a seat plate portion 6 of a low electrode 5. Accordingly, a large fastening force is required when the bus bar 50A is fastened to the low electrode 5 by the nut 60. Therefore, if the nut 60 is fastened to the electrode 5 with a constant fastening force when the displacement H occurs, the bus bar 50A may be fastened incompletely on the low electrode 5.

On the other hand, according to the bus bar module 10 in the present embodiment, when the pole post 7 of the electrode 5 is inserted into the fastening hole 51 of the bus bar 50 and the nut 60 is screwed to fasten the bus bar 50 to the electrode 5, the projection 52 of the bus bar 50 supported on the support portion 43 is easily elastically deformed. Therefore, even if the displacement H in an assembling direction of the bus bar 50 occurs between the electrodes 5 of the adjacent single cells 3, it is possible to easily absorb the displacement H by the elastic deformation of the projection 52. In this case, the support portion 43 has a width W1 smaller than an interval W2 between inner side surfaces of the side plate portions 53 of the projection 52, so that side surfaces of the support portion 43 do not abut against the inner surfaces of the side plate portion 53 of the projection 52, and thus do not prevent the elastic deformation. Accordingly, when the bus bar 50 is connected to the electrode 5 by the nut 60, it is possible to constantly and stably fasten the bus bar 50 with a predetermined fastening force and to attain good connection reliability.

In addition, the support portion 43 is in line contact with the back surface of the upper plate portion 54 of the projection 52 in a direction orthogonal to an arrangement direction of the fastening holes 51. Accordingly, when the bus bar 50 is fastened to the electrode 5 in a state in which the displacement H in the assembling direction of the bus bar 50 has occurred between the electrodes 5 of the adjacent single cells 3, it is possible to easily incline the bus bar 50 using a part thereof in contact with the support portion 43 as a fulcrum. Accordingly, it is possible to more easily absorb the displacement H between the electrodes 5 of the single cells 3.

When the bus bar 50 is fastened to the electrodes 5 of the single cells 3 with three or more fastening holes 51, the displacement H in the assembling direction of the bus bar 50 is likely to occur among the electrodes 5 of three or more adjacent single cells 3. However, the projection 52 of the bus bar 50 formed between the fastening holes 51 is supported on the support portion 43. Accordingly, even if the displacement H occurs among the electrodes be shifted fastened in the fastening holes 51, it is possible to elastically deform the projection 52 supported by the support portion 43 between the fastening holes 51 to easily absorb the displacement H.

The present invention is not limited to the above-described embodiment, and may be appropriately modified, improved, or the like. In addition, materials, shapes, sizes, numbers, arrangement positions, and the like of components in the above-described embodiment are optional as long as the present invention can be achieved, and the present invention is not limited thereto.

For example, in the above-described bus bar 50 according to the embodiment, a case has been described as an example in which the fastening holes 51 are formed as a plurality of electrical connection portions configured to electrically connect and fix the plurality of electrodes 5 of the single cells 3, and the nut 60 is screwed to be fastened and fixed to the pole post 7 of the electrode 5 passed through the fastening hole 51. It is needless to say that the electrical connection portion of the bus bar according to the present invention is not limited thereto, and may be a welded portion that is fixed to the electrode by welding.

[1] A bus bar module (10) including:
a case (20) that is assembled to a battery assembly (1) including a plurality of single cells (3); and
a bus bar (50) that is supported by the case (20), that is electrically connected to an electrode (5) of the single cell (3) of the battery assembly (1), and that is formed of a conductive metal plate,
in which the bus bar (50) includes:
a plurality of electrical connection portions (fastening holes 51) configured to electrically connect and fix a plurality of the electrodes (5) of the single cells (3); and
a plurality of projections (52) that are each formed between the electrical connection portions (the fastening holes 51) and protrude in a direction away from the single cell (3),
in which the case (20) includes:
a bus bar housing portion (21) in which the bus bar (50) is housed; and
a support portion (43) that is provided in the projection (52) of the bus bar (50) housed in the bus bar housing portion (21) and abuts against a back surface of the projection (52) to support the bus bar (50), and
[2] in which the support portion (43) has a width (W1) smaller than an interval (W2) between inner side surfaces of side plate portions (53) of the projection (52).
The bus bar module according to [1],
in which the support portion (43) is in line contact with the back surface of the projection (52) in a direction orthogonal to an arrangement direction of the electrical connection portions (the fastening holes 51).
[3] The bus bar module according to [1],
in which, in the bus bar (50), three or more electrical connection portions (the fastening holes 51) are formed at equal intervals, and the projections (52) are formed between the electrical connection portions (the fastening holes 51), respectively, and
in which the case (20) includes the support portion (43) corresponding to each of the projections (52) of the bus bar (50) housed in the bus bar housing portion (21).

What is claimed is:
1. A bus bar module comprising:
a case that is assembled to a battery assembly including a plurality of single cells; and
a bus bar that is supported by the case and that is formed of a conductive metal plate electrically connected to an electrode of the single cell of the battery assembly,
wherein the bus bar includes:
a plurality of electrical connection portions configured to electrically connect and fix a plurality of the electrodes of the single cells; and
a plurality of projections that are each formed between the electrical connection portions and protrude in a direction away from the single cell,
wherein the case includes:
a bus bar housing portion in which the bus bar is housed; and
a support portion that is provided in the projection of the bus bar housed in the bus bar housing portion and abuts against a back surface of the projection to support the bus bar,
wherein a peripheral wall portion of the bus bar housing portion includes a pair of long side portions and a pair of short side portions,
wherein the short side portions are provided continuously with both ends of the long side portion,
wherein the support portion is integrally formed being bridged over the long side portions of the peripheral wall portion, and a plurality of the support portions are provided at intervals in a longitudinal direction of the bus bar housing portion, and
wherein the support portion has a width smaller than an interval between inner side surfaces of side plate portions of the projection.
2. The bus bar module according to claim 1, wherein the support portion is in line contact with the back surface of the projection in a direction orthogonal to an arrangement direction of the electrical connection portions.
3. The bus bar module according to claim 1,
wherein, in the bus bar, three or more electrical connection portions are formed at equal intervals, and the projections are formed between the electrical connection portions, respectively, and
wherein the case includes the support portion corresponding to each of the projections of the bus bar housed in the bus bar housing portion.
4. The bus bar module according to claim 1,
wherein the bus bar housing portion includes a plurality of locking claws on the long side portion, and
wherein when the bus bar has been housed in the bus bar housing portion from above, a periphery of the bus bar is locked by the locking claws.

* * * * *